Aug. 7, 1923.

H. M. MILLER 1,463,964

APPARATUS FOR TREATING VEGETABLES OR FRUIT WITH A SKIN LOOSENING AGENT

Filed Dec. 12, 1921

Inventor
Harry M. Miller
By Lyon & Lyon
attys.

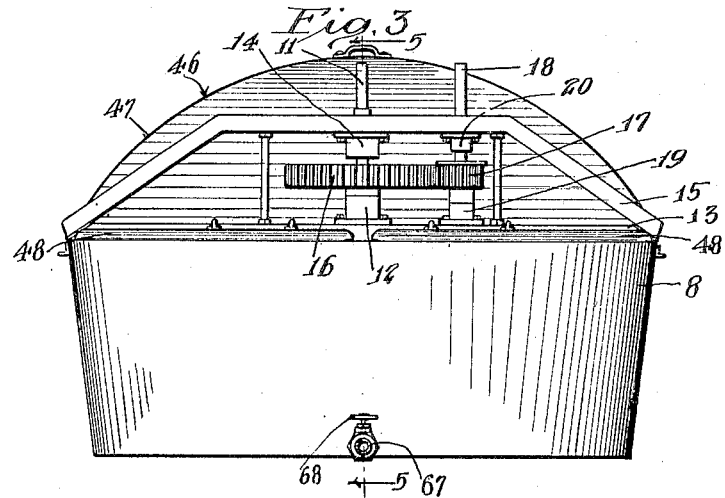
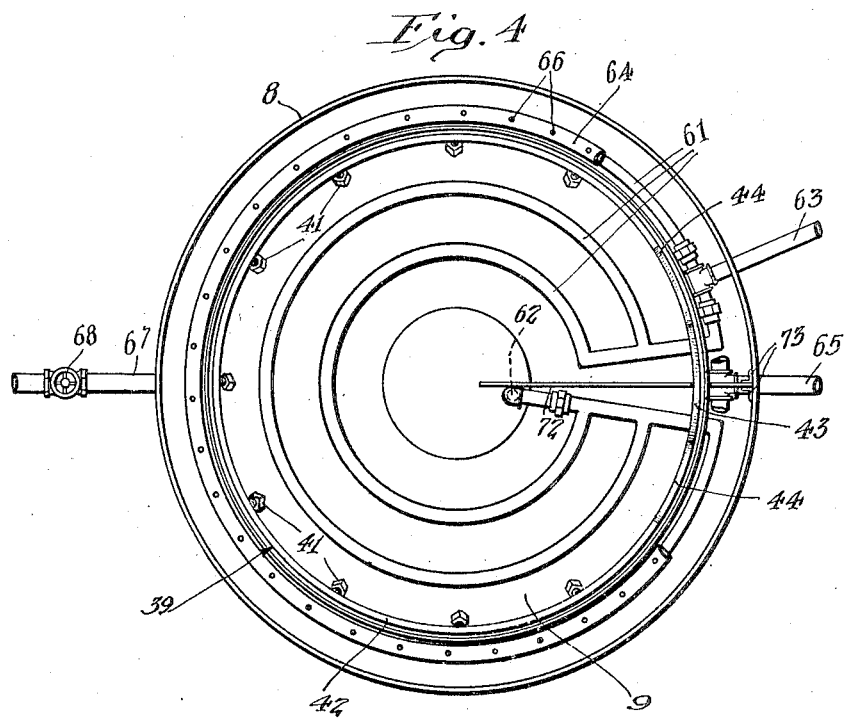

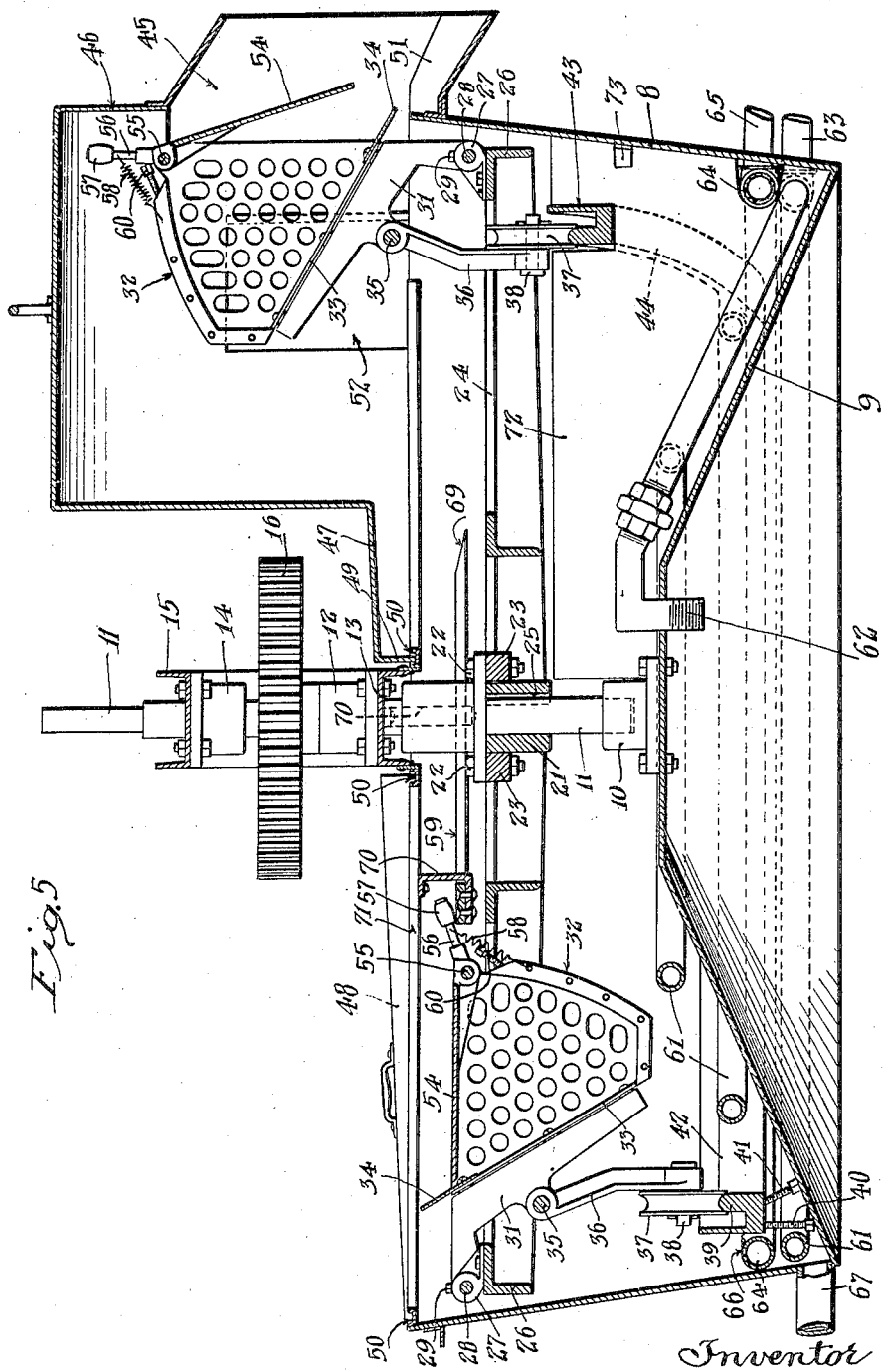

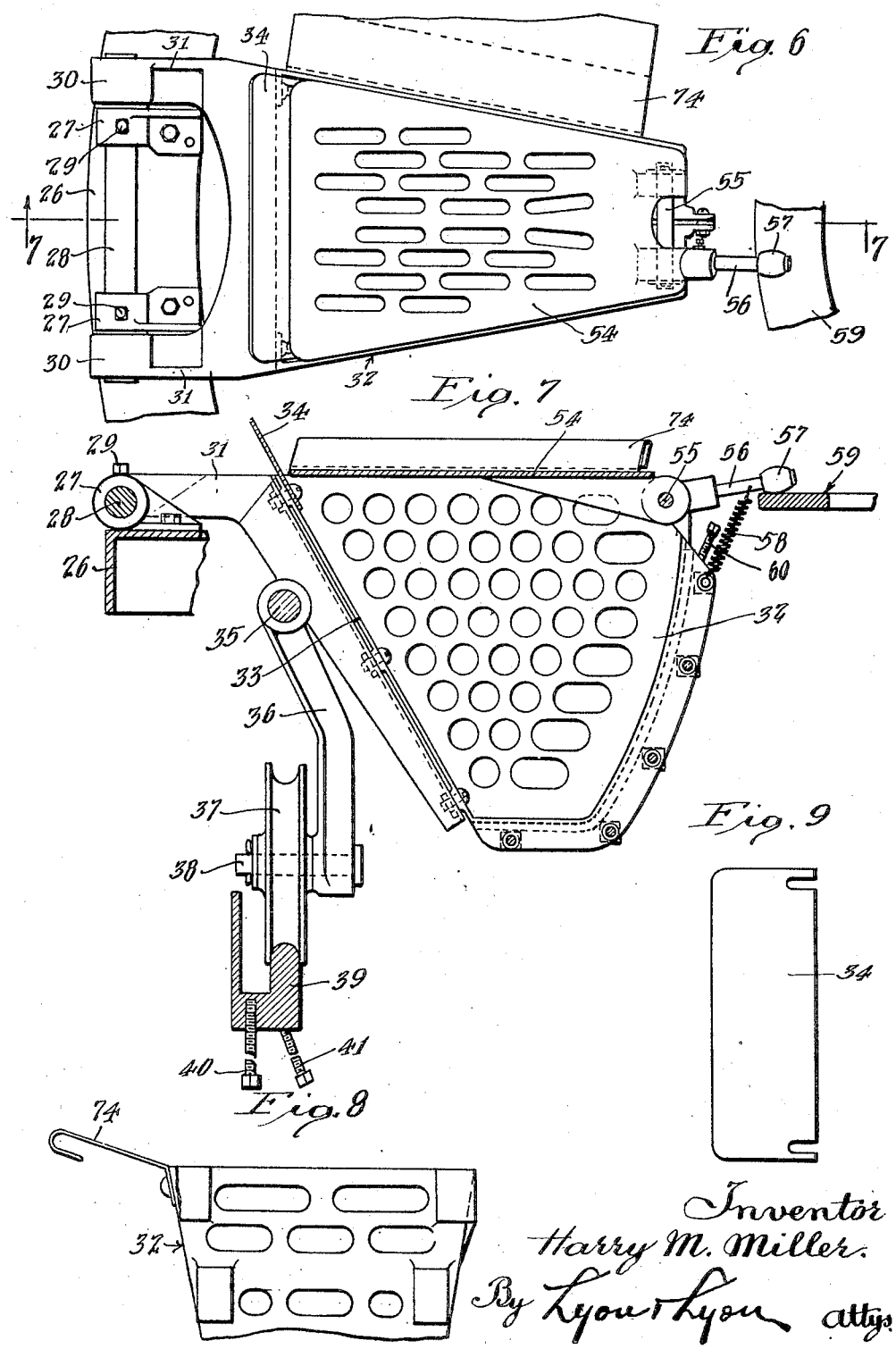

Patented Aug. 7, 1923.

1,463,964

UNITED STATES PATENT OFFICE.

HARRY M. MILLER, OF SOUTH PASADENA, CALIFORNIA, ASSIGNOR TO NATIONAL PEELING MACHINE COMPANY, OF LOS ANGELES, CALIFORNIA, A CORPORATION OF CALIFORNIA.

APPARATUS FOR TREATING VEGETABLES OR FRUIT WITH A SKIN-LOOSENING AGENT.

Application filed December 12, 1921. Serial No. 521,594.

*To all whom it may concern:*

Be it known that I, HARRY M. MILLER, a citizen of the United States, residing at South Pasadena, in the county of Los Angeles and State of California, have invented a new and useful Apparatus for Treating Vegetables or Fruit with a Skin-Loosening Agent, of which the following is a specification.

This invention relates to an apparatus for passing vegetables or fruit through a peeling agent for the purpose of loosening the skins thereof in order that the skins may be subsequently easily removed from the pulp bodies by any suitable operation, for example, by washing the skins from the pulp bodies with water. This washing operation may be effected by passing the tomatoes through a body of water as disclosed in Patent No. 1,394,138 granted to W. D. Bost and myself Oct. 18, 1921, or by peeling-jets of the type employed in the well-known peach-peeling machines, or by water discharged under substantially no head and entering openings previously made in the skins of the vegetables, or fruit, as disclosed in Patent No. 1,384,379, granted to W. D. Bost and myself July 12, 1921.

An object of the invention is to effect the treatment of vegetables or fruit with a peeling solution, in such manner as to not bruise or crush them. The apparatus can be used on either vegetables as, for example, tomatoes, or on fruit as, for example, peaches. Peaches have heretofore been successfully treated in machines that could not be used for treating tomatoes without crushing and bruising them. This for the reason that tomatoes are much softer than the immature peaches which are treated by known processes.

To effect the objects of this invention the vegetables or fruit are carried through the peeling solution in baskets or receptacles immersed in such solution.

The accompanying drawings illustrate the newly invented apparatus.

Fig. 1 is a plan view of the apparatus,

Fig. 2 is a plan view of Fig. 1, with the covers omitted. Some of the baskets are omitted and some of the perforations of others are omitted. Also a portion of one of the spokes of the carrier is broken away to disclose the baffle plate.

Fig. 3 is a side elevation of Fig. 1 from the left thereof.

Fig. 4 is a plan view of the tank with the pipes and baffle plate in place therein.

Fig. 5 is an enlarged sectional elevation on the line indicated by 5—5, Figs. 1 and 3.

Fig. 6 is an enlarged plan detail of one of the baskets and the adjacent portion of the rotary basket carrier.

Fig. 7 is a sectional elevation on the line 7—7, Fig. 6, the basket tilting means also being shown, and the track being in section.

Fig. 8 is a fragmental end elevation of the basket in Fig. 6 from the left thereof.

Fig. 9 is a plan view of one of the lips detached.

Figure 1:
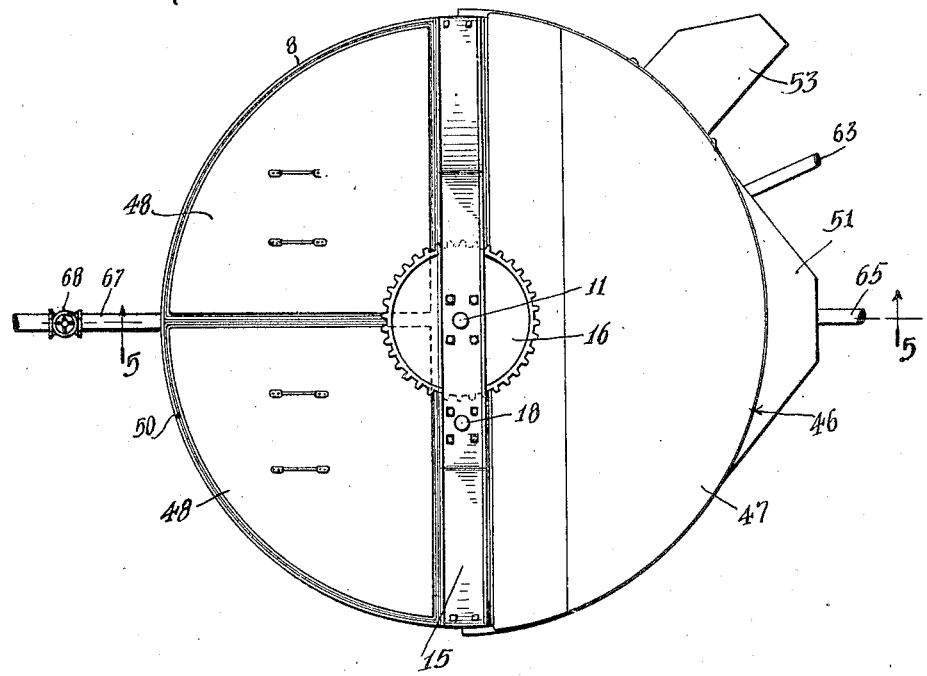

In the drawings there is indicated a tank 8 to hold the peeling solution. In order to minimize the quantity of peeling solution required in the operation of the apparatus, the bottom 9 of the tank is preferably of frusto-conical shape so that the depth of the peeling solution will be a maximum adjacent the periphery of the tank and of less depth nearer the center. The tank 8 is cylindrical, and mounted on the bottom 9 is a step bearing 10 in which is journaled a vertical shaft 11. The shaft 11 is also journaled in a bearing 12 mounted on a cross member 13 which is secured at its opposite ends to the rim of the tank 8. The shaft 11 is also journaled in a bearing 14 secured to a bridge 15 which is mounted at its ends upon the cross member 13 so as to form a bracket to space the bearing 14 from the bearing 12. Between the bearings 12, 14 on the shaft 11 is a spur gear 16 for turning the shaft. The gear 16 meshes with a spur pinion 17 mounted on a vertical pinion shaft 18. The shaft 18 is journaled at its lower end in a step bearing 19 mounted on the cross member 13. The shaft 18 is also journaled in a bearing 20 secured to the bridge 15. The shaft 18 projects above the bridge 15 to receive a pulley, not shown, or other suitable driving means.

Keyed to the shaft 11 between the bearings 10 and 12 is a hub 21 comprising two sections secured together by bolts 22. The bolts 22 also pass through clamping plates 23 engaging the under faces of the flanges of spokes 24 which are T-shaped in cross section. Thus the spokes 24 are supported by the hub 21 which in turn is supported by the shaft 11, being secured to said shaft by a key 25 or other suitable means.

Figure 2:
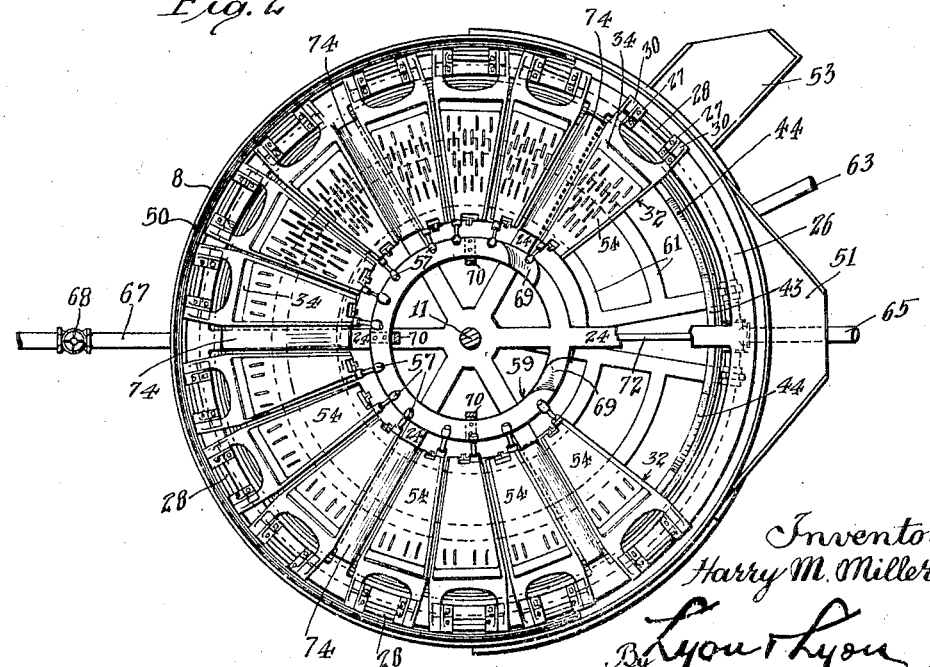

The spokes 24 carry a rim 26 upon which are mounted pairs of bearings 27. The hub, spokes and rim constitute a rotary carrier. Each pair of bearings 27 supports a shaft 28 held in fixed relation with the bearings 27 by set screws 29 mounted in said bearings and engaging the shaft. Journaled on each of the shafts 28 is a pair of bearings 30 on the outer ends of angular arms 31 secured to a perforate basket 32. There is thus a series of baskets arranged in a circle, there being in the instance shown in Fig. 2 three baskets between each two adjacent spokes 24. When the baskets 32 are in the lowered position, shown on the left in Fig. 5, the wall 33 adjacent the periphery of the tank extends aslant upwardly and outwardly and the upper edge of said wall is provided with a lip 34 for a purpose hereinafter to appear.

The weight of the baskets 32 is not entirely supported by the carrier, but said baskets, together with what tomatoes or fruit are placed therein, are mainly supported by other means which will now be described.

Each of the arms 31 is pivoted at 35 to a standard 36 which is supported at its lower end by a grooved wheel 37 rotatably connected by a stud 38 to said standard. The axis of the pivot 35 is parallel with the axis of the shaft 28 so that the basket 32 can be swung outwardly about the shaft 28 by vertical movement of the standard 36. The axis of the stud 38 is at a right angle to the axis of the pivot 35 and the wheels 37 run upon a circular track 39 mounted on the bottom of the tank 8. The track is preferably adjustably mounted at different points by screws 40, 41, projecting from the underface of the track and seated upon the tank bottom 9. The track comprises a lower portion 42, a raised level portion 43 and slanting portions 44 connecting the raised portion with the lower portion.

When the wheels 37 are on the lower portion 42 of the track the baskets 32 are in the lowered position indicated on the left in Fig. 5, and when the wheels 37 engage the raised portion 43 of the track the baskets are in the dumping raised position indicated on the right in Fig. 3. When the baskets are in the dumping position, the side 33 thereof extends aslant downwardly and outwardly above the level of the rim of the tank and the lip 34 bridges over the space between the outer edge of the basket side 33 and the rim of the tank so that the fruit discharging from the basket will not fall into the tank.

The raised portion 43 of the track is arranged adjacent to and in alinement with a discharge opening 45 formed in the hood 46 of a segmental cover member 47. The cover member 47 is substantially semi-circular, and two other segmental cover members 48 are substantially quadrants so that they together cover the entire tank. These cover members 47, 48 are provided at their margins with downwardly extending flanges 49, which extend into grooves 50 of the tank so that the condensate from steam will make a liquid seal for the cover members. The opening 45 communicates with a spout 51 formed in sections, one section being attached to the hood 46 and the other section to the tank 8.

The hood 46 is also provided with a feed opening 52 which registers with a chute 53 formed in sections, the upper section being secured to the hood and the lower section to the tank. The feed and discharge openings substantially adjoin and the raised portion 43 of the track is sufficiently long to maintain the baskets in raised position as they move across the discharge opening.

The rotary carrier 21, 24, 26, is positioned somewhat below the level of the rim of the tank so that when the tank is substantially filled with liquid the baskets, when in lowered position, will be immersed in the liquid. When thus immersed some of the tomatoes or fruit bodies may tend to float out of the basket and I therefore provide a lid 54 for each basket. Each lid 54 is hinged at 55 to that wall of the basket which is nearest the shaft 11 and each lid is provided with an arm 56 carrying a roller 57. Each arm 56 is connected by a coil spring 58 to the adjacent side of the basket so as to tend to swing the arm downwardly to raise its lid 54.

During movement of the baskets around the shaft 11, while the wheels 37 engage the lower portion 42 of the track, it is necessary to hold the arms 56 in raised position against the pull of the springs 58 so that the lids 54 cannot be opened by said springs; and for this reason the rollers 57, when the baskets are in lowered position in the tank, engage the upper face of a curved member 59 positioned horizontally and connected by hangers 70 to the cross member 13 and to a member 71 extending at a right angle from the middle portion of the cross member to the rim of the tank. The member 59 is not a complete circle but is open at the portion opposite to the discharge opening 45 so that, as the baskets come into registration with the feed opening 52, the rollers will not engage the member 59, thus permitting the lid to remain open for filling.

In order to limit downward movement of the rollers 57, so as to prevent the rollers passing beneath the level of the member 59 when they reach the opening in said member, an adjustable stop 60, in the form of a screw, is mounted on each basket to engage the associated arm 56. When the arm is in engagement with the stop and the basket is tilted, the lid is open sufficiently to permit the contents of the basket to discharge therefrom, and to permit vegetables or fruit to be fed into the basket provided the side wall 33 thereof extends aslant inwardly and downwardly.

A steam heating coil 61 is mounted in the tank, the intake pipe being indicated at 62 and the exhaust pipe at 63. There is also preferably mounted in the tank a coil 64, connected with an intake pipe 65 extending to steam and water supplies so that either can be inducted into the coil 64. The coil 64 is provided with perforations 66 for discharging the steam and water into the tank. The tank is thus filled and the water initially and quickly heated by the steam supplied through the coil 64.

A drain pipe 67 is connected with the lower portion of the tank 8 and is provided with a valve 68.

The operation of the apparatus and the method of treating the vegetables or fruits therein are as follows:

It may be assumed that the apparatus is being driven, that a hot peeling agent as, for example, an alkali solution, is contained in the tank 8 at a level to cover the baskets, when they are in lowered position, and that one of the baskets is in the raised position shown in Fig. 5 in register with the discharge spout 51 and has just been emptied of its contents. This basket travels in a direction away from the observer, or counterclockwise in Fig. 2, toward the feed chute 52. During this movement the roller 37 descends one of the slanting portions 44 of the track, thus swinging the basket downwardly and inwardly. While the roller 57, associated with said basket, is in the opening in the member 59, the vegetables or fruit are deposited in the chute 52 and they discharge by gravity into the basket. The filling of the basket occupies but a fraction of a minute and, as the basket moves away from the opening, the roller 57 engages the slanting face 69 of the member 59, thus swinging the lid closed. The basket moves in a circle, thus carrying the vegetables or fruit through the peeling solution. Any of the vegetables or fruit bodies that may be so light as to tend to rise to the surface of the solution are prevented from floating out of the basket by the closed lid. It will be seen that by thus carrying the vegetables or fruit in the basket through the peeling solution there is no liability of crushing or bruising them, and at the same time the vegetables or fruit are thoroughly laved by the solution, because of the motion therethrough. This gentle handling of the bodies being treated is especially important in the treatment of soft pitless bodies such, for example, as tomatoes, and the apparatus is especially useful in handling tomatoes, though it is to be understood that other vegetables and fruits may be treated therein with equal facility.

The strength of the peeling solution and the period of rotation of the basket are such that the peeling solution will effect loosening of the skin from the pulp body before the basket reaches the discharge spout 51. As the basket nears said spout the roller 37 mounts the incline 44 and passes on to the level portion 43 of the track. This raising of the roller swings the basket upwardly and outwardly into the position shown at the right of Fig. 5 and at the same time raises the roller 57 from engagement with the member 59 so as to permit the spring 60 to open the lid. By the time that the basket is sufficiently tilted to discharge the contents therefrom, said basket registers with the spout 51, and the vegetables or fruit thus discharged from the basket into said spout may be received by a peeling machine in conjunction with which this apparatus may be used.

It is preferable to prevent swirling of the peeling solution and, therefore, an upright baffle plate 72 is mounted in the tank 8 and is secured thereto by fastening devices 73. In this instance the baffle plate is alined with the raised portion 43 of the track and said portion passes over the baffle plate, thus permitting the upper edge of the baffle plate to be positioned at about the surface of the peeling solution.

One of the baskets adjacent each spoke is provided with an apron 74 extending over the spoke to prevent the vegetables or fruit from falling between the baskets during the operation of filling the baskets.

I claim:

1. In an apparatus of the character described, the combination of a tank, a carrier movably mounted in the tank, means to move the carrier, baskets tiltably mounted on the carrier, and means to tilt the baskets into position to discharge over the rim of the tank.

2. In an apparatus of the character described, the combination of a tank, baskets provided with lids, means to move the baskets in the tank, and means operating as the baskets move to open and close the lids at predetermined positions of the baskets in relation to the tank.

3. In an apparatus of the character described, the combination of a tank, a carrier movably mounted in the tank, means to move the carrier, baskets tiltably mounted on the carrier and provided with lids, means to tilt the baskets into position to discharge over the rim of the tank and to then retract the baskets from tilted position, means operating to open the lids as the baskets tilt and retract and to thereafter close the lids.

4. In an apparatus of the character described, the combination of a tank, baskets provided with lids, means to move the baskets in the tank, and cooperating means on the tank and lids to hold the lids closed.

Signed at Los Angeles, California, this 2d day of December, 1921.

HARRY M. MILLER.

Witnesses:
GEORGE H. HILES,
L. BELLE WEAVER.